United States Patent
Yoon et al.

(10) Patent No.: US 10,288,962 B2
(45) Date of Patent: May 14, 2019

(54) DISPLAY DEVICE AND METHOD OF MANUFACTURING THE SAME

(75) Inventors: Yeo Geon Yoon, Seoul (KR); Jun Ho Song, Seongnam-si (KR); Byeong Jae Ahn, Suwon-si (KR); Sung Ho Kang, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 1342 days.

(21) Appl. No.: 13/244,093

(22) Filed: Sep. 23, 2011

(65) Prior Publication Data

US 2012/0146971 A1    Jun. 14, 2012

(30) Foreign Application Priority Data

Dec. 10, 2010  (KR) ........................ 10-2010-0126304

(51) Int. Cl.
  *G02F 1/1362* (2006.01)
  *G02F 1/1343* (2006.01)
  *G02F 1/1337* (2006.01)

(52) U.S. Cl.
  CPC ...... *G02F 1/13624* (2013.01); *G02F 1/13439* (2013.01); *G02F 1/133707* (2013.01); *G02F 2001/134345* (2013.01); *Y10T 29/49156* (2015.01)

(58) Field of Classification Search
  CPC .................... G02F 1/13624; G02F 1/13439
  See application file for complete search history.

(56) References Cited

U.S. PATENT DOCUMENTS

| | | | |
|---|---|---|---|
| 5,084,905 A | * | 1/1992 | Sasaki ..................... H01L 27/12 257/347 |
| 6,429,057 B1 | | 8/2002 | Hong et al. |
| 6,836,299 B2 | | 12/2004 | Chung et al. |
| 6,922,217 B2 | | 7/2005 | Kim |
| 7,358,528 B2 | | 4/2008 | Kim et al. |
| 8,149,346 B2 | | 4/2012 | Kimura |
| 8,619,207 B2 | * | 12/2013 | Kim ................................ 349/43 |
| 8,830,429 B2 | * | 9/2014 | Ishigaki et al. ............... 349/138 |
| 8,871,590 B2 | * | 10/2014 | Choi et al. .................... 438/268 |
| 2001/0030322 A1 | * | 10/2001 | Yamazaki ........... G02F 1/13454 257/59 |
| 2002/0014470 A1 | * | 2/2002 | Okada et al. ................... 216/24 |
| 2002/0063253 A1 | | 5/2002 | Hong et al. |
| 2003/0086046 A1 | * | 5/2003 | You ............................... 349/149 |
| 2003/0222311 A1 | | 12/2003 | Kim |
| 2005/0212412 A1 | * | 9/2005 | Kurosawa ........... H01L 51/5271 313/504 |
| 2006/0077324 A1 | | 4/2006 | Ahn |
| 2006/0132685 A1 | * | 6/2006 | You ............................... 349/114 |
| 2006/0181655 A1 | * | 8/2006 | Shiota ............... G02F 1/136227 349/43 |

(Continued)

FOREIGN PATENT DOCUMENTS

| | | |
|---|---|---|
| CN | 1251914 A | 5/2000 |
| CN | 1618037 A | 5/2005 |

(Continued)

*Primary Examiner* — Edward Glick
*Assistant Examiner* — Anthony G Quash
(74) *Attorney, Agent, or Firm* — Cantor Colburn LLP

(57) ABSTRACT

A display device includes a first substrate and a pixel electrode on the first substrate. A thickness of the pixel electrode is about 40 nanometers (nm) or less.

20 Claims, 15 Drawing Sheets

(56) References Cited

U.S. PATENT DOCUMENTS

| | | | |
|---|---|---|---|
| 2007/0139571 A1* | 6/2007 | Kimura | G02F 1/133707 349/43 |
| 2008/0048184 A1* | 2/2008 | Oh | H01L 51/442 257/40 |
| 2008/0079010 A1* | 4/2008 | Kim | H01L 27/1251 257/88 |
| 2008/0087904 A1* | 4/2008 | Heo | G02F 1/133555 257/89 |
| 2008/0136989 A1* | 6/2008 | Higaki et al. | 349/46 |
| 2008/0198287 A1* | 8/2008 | Kim | G02F 1/13454 349/42 |
| 2008/0198319 A1* | 8/2008 | Kim et al. | 349/147 |
| 2008/0212009 A1* | 9/2008 | Nakano | 349/141 |
| 2009/0086143 A1 | 4/2009 | Kaneko et al. | |
| 2009/0121982 A1* | 5/2009 | Choi | H01L 27/3262 345/76 |
| 2009/0179202 A1* | 7/2009 | Hong | G02F 1/13458 257/59 |
| 2009/0310047 A1* | 12/2009 | Shin | G09G 3/3659 349/37 |
| 2010/0038642 A1* | 2/2010 | Choi | G02F 1/136227 257/59 |
| 2010/0230679 A1* | 9/2010 | Kim | G02F 1/136227 257/59 |
| 2011/0063557 A1* | 3/2011 | Kim et al. | 349/141 |

FOREIGN PATENT DOCUMENTS

| | | | |
|---|---|---|---|
| CN | 1949511 A | 4/2007 | |
| CN | 101609235 A | 12/2009 | |
| JP | 11126907 A * | 5/1999 | ........... H01L 29/786 |
| JP | 2002-258325 A | 9/2002 | |
| JP | 2003188385 A * | 7/2003 | |
| JP | 2008-129304 A | 6/2008 | |
| JP | 2009-104108 A | 5/2009 | |
| JP | 2009-244300 A | 10/2009 | |
| JP | 2010181785 A | 8/2010 | |
| KR | 10-2005-0099765 A | 10/2005 | |
| KR | 10-2006-0032034 A | 4/2006 | |
| KR | 10-2006-0073372 A | 6/2006 | |
| KR | 10-2006-0134485 A | 12/2006 | |
| KR | 10-0662790 B | 12/2006 | |
| KR | 1020070041363 A | 4/2007 | |
| KR | 10-0766493 B | 10/2007 | |
| KR | 10-2008-0103848 A | 11/2008 | |
| KR | 10-2009-0033809 A | 4/2009 | |
| KR | 10-2009-0060078 A | 6/2009 | |
| KR | 10-2009-0072548 A | 7/2009 | |
| KR | 1020100032074 A | 3/2010 | |
| KR | 1020100103059 A | 9/2010 | |
| WO | 2003100511 A1 | 12/2003 | |

* cited by examiner

DISPLAY DEVICE AND METHOD OF MANUFACTURING THE SAME

This application claims priority to Korean Patent Application No. 10-2010-0126304 filed on Dec. 10, 2010, and all the benefits accruing therefrom under 35 U.S.C. § 119, the entire contents of which are incorporated herein by reference.

BACKGROUND OF THE INVENTION (1) Field of the Invention

The present invention relates to a display device and a method for manufacturing the same, and more particularly, to a display device that includes a pixel electrode formed on a substrate.

(2) Description of the Related Art

Among display devices, a liquid crystal display is one of flat panel displays that are most widely used. The liquid crystal display includes two display panels on which field generating electrodes such as a pixel electrode and a common electrode are formed, and a liquid crystal layer that is interposed therebetween. The liquid crystal display displays images by applying a voltage to the field generating electrode to generate an electric field on the liquid crystal layer, thereby determining the direction of liquid crystal molecules of the liquid crystal layer, and controlling the polarization of incident light. As the display device, there are an organic light emitting diode display, a plasma display panel, and an electrophoretic display, in addition to the liquid crystal display.

The display device generally includes a display panel that is provided with a pixel including a switching element and display signal lines, a gate driver that turns on and off the switching element of the pixel by transmitting a gate signal to a gate line of the display signal lines, a data driver that applies a data voltage to a data line, and a signal controller that controls them.

The gate driver and data driver may be mounted on the display device in an integrated chip ("IC") chip form, attached to the display device in a tape carrier package ("TCP") form mounted on a flexible printed circuit film, or mounted on a printed circuit board. Particularly, the gate driver may be integrated on the display panel by being formed by the same process as the display signal line and switching element.

The display device may form a plurality of switching elements and a plurality of signal lines on a multi-layer. The incident light that is incident on the display device may penetrate the multilayer or reflect on the layer interface. In the case when the transmittance of the incident light is low and reflectivity is high, there is a problem in that efficiency of the display device is reduced, for example, power consumption is increased.

The above information disclosed in this Background section is only for enhancement of understanding of the background of the invention and therefore it may contain information that does not form the prior art that is already known in this country to a person of ordinary skill in the art.

BRIEF SUMMARY OF THE INVENTION

The present invention has been made in an effort to provide a display device having advantages of increasing transmittance, and a method for manufacturing the same.

An exemplary embodiment of the present invention provides a display device including first substrate, and a pixel electrode on the first substrate. A thickness of the pixel electrode is about 40 nanometers (nm) or less.

In an exemplary embodiment, a thickness of the pixel electrode may be about 30 nm.

In an exemplary embodiment, the pixel electrode may include indium-tin-oxide ("ITO").

In an exemplary embodiment, the pixel electrode may include a plurality of fine branched parts.

In an exemplary embodiment, the pixel electrode may include a first subpixel electrode and a second subpixel electrode which are separated from each other, and the first subpixel electrode and second subpixel electrode may each include a plurality of fine branched parts.

In an exemplary embodiment, the display device may further include a data line and a gate line on the first substrate. The first subpixel electrode may be connected through a first switching element to the data line and the gate line, the second subpixel electrode may be connected through a second switching element to the data line and the gate line, and second subpixel electrode may be connected through a third switching element to a capacitor.

In an exemplary embodiment, the display device may further include a second substrate which faces the first substrate. A common electrode which receives a common voltage may be on the second substrate.

Another exemplary embodiment of the present invention provides a display device including a substrate, a pixel part on the substrate and including a pixel electrode, a contact hole on the substrate, and a contact portion on the contact hole. A thickness of the pixel electrode is about 40 nm or less, and a thickness of the contact portion is larger than the thickness of the pixel electrode.

In an exemplary embodiment, the thickness of the contact portion may be larger than the thickness of the pixel electrode by 10 nm or more.

In an exemplary embodiment, the contact portion may include a contact member and an auxiliary member on the contact member, contact member may be in a same layer as the pixel electrode, and the contact member may include a same material as the pixel electrode.

In an exemplary embodiment, the auxiliary member may have a higher etching rate than the contact member.

In an exemplary embodiment, the auxiliary member may be only on the contact hole.

In an exemplary embodiment, the display device may further include a driver on the substrate and transmitting a signal to the pixel part. The contact hole may be on the driver.

In an exemplary embodiment, the pixel part may further include a switching element that is connected to the pixel electrode, a gate line that is connected to the switching element and transmits a gate signal to the switching element, and a data line that is connected to the switching element and transmits a data signal to the pixel electrode.

In an exemplary embodiment, the display device may further include a gate pad connected to an end of the gate line. The contact hole may be on the driver.

In an exemplary embodiment, the display device may further include a data pad connected to an end of the data line. The contact hole may be on the data pad.

Yet another exemplary embodiment of the present invention provides a display device including, a substrate, a pixel part on the substrate and including a pixel electrode, and a driver on the substrate and transmitting a signal to the pixel part. A thickness of the pixel electrode is about 40 nm or less. The driver includes a gate layer on the substrate, a gate insulating layer on the gate layer, a first contact hole extending through a thickness of the gate insulating layer, a data layer on the first contact hole and the gate insulating layer, and connected to the gate layer, and a passivation layer which overlaps the data layer.

In an exemplary embodiment, the passivation layer may include a second contact hole extending through a thickness of the passivation layer and exposing the data layer. A contact member may be on the second contact hole.

In an exemplary embodiment, the pixel part may further include a gate line and a data line on the substrate. The display device may further include a gate pad connected to an end of the gate line, the gate insulating layer covering the gate pad; a third contact hole extending through a thickness of the gate insulating layer and on the gate pad, a second data layer connected to the gate pad, in the third contact hole and on the gate insulating layer, the passivation layer overlapping the second data layer, a fourth contact hole extending through a thickness of the passivation layer and overlapping the second data layer. The contact member may be in the fourth contact hole. The second data layer may be in a same layer as the data line, the second data layer may include a same material as the data line, and the second data layer may not be connected to the data line.

In an exemplary embodiment, the contact member may be in a same layer as the pixel electrode, and the contact member may include the same material as the pixel electrode.

Still another exemplary embodiment of the present invention provides a display device including a substrate, a pixel part on the substrate and including a pixel electrode, a contact hole on the substrate, a metal layer which fills the contact hole, and a contact member which is connected to the metal layer. A thickness of the pixel electrode is about 40 nm or less.

In an exemplary embodiment, the contact member may be in a same layer as the pixel electrode, and the contact member may include a same material as the pixel electrode.

In an exemplary embodiment, the display device may further include a driver on the substrate and transmitting a signal to the pixel part. The contact hole may be on the driver.

In an exemplary embodiment, the pixel part may further include a switching element which is connected to the pixel electrode, a gate line that is connected to the switching element and transmits a gate signal to the switching element, and a data line that is connected to the switching element and transmits a data signal to the pixel electrode.

In an exemplary embodiment, the display device may further include a gate pad which is connected to an end of the gate line. The contact hole may be on the gate pad.

In an exemplary embodiment, the display device may further include a data pad which is connected to an end of the data line. The contact hole may be on the data pad.

In an exemplary embodiment, the switching element may include a gate electrode which is connected to the gate line, a source electrode which is connected to the data line, and a drain electrode which is connected to the pixel electrode. The contact hole may be on the drain electrode.

In an exemplary embodiment, the metal layer may fill the contact hole by using an electroless plating method.

Still yet another exemplary embodiment of the present invention provides a method for manufacturing a display device, the method including forming a first conductive layer on a substrate, forming an insulating layer on the first conductive layer, forming a contact hole extending through a thickness of the insulating layer, which exposes the first conductive layer, forming a transparent layer on the insulating layer and in the contact hole, forming a second conductive layer on the transparent layer; forming a contact member overlapping the contact hole and forming a pixel electrode through one etching operation. The pixel electrode is formed of the transparent layer and the second conductive layer, and the contact member is formed from the transparent layer and second conductive layer. The method further includes removing the second conductive layer of the pixel electrode through partial etching.

In an exemplary embodiment, a thickness of the pixel electrode may be about 40 nm or less.

According to exemplary embodiments of the present invention, it is possible to increase transmittance of a display device by reducing a thickness of a pixel electrode of a display device.

BRIEF DESCRIPTION OF THE DRAWINGS

The following and other aspects, advantages and features of this disclosure will become more apparent by describing in further detail exemplary embodiments thereof with reference to the accompanying drawings, in which.

DETAILED DESCRIPTION OF THE INVENTION

Figure 1:
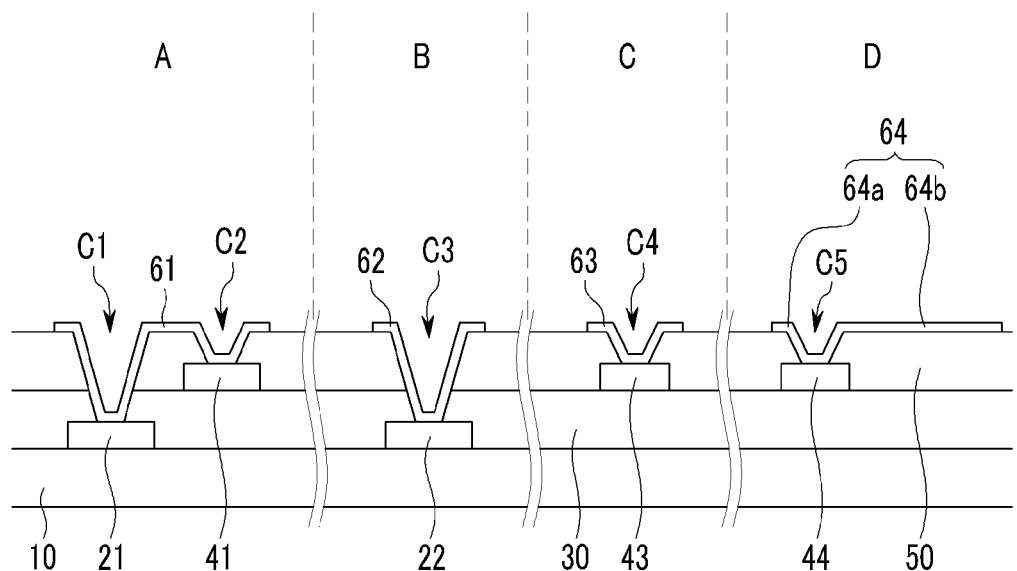
FIG. 1 is a cross-sectional view that schematically illustrates a structure of an exemplary embodiment of a display device according to the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

FIG. 1 is a cross-sectional view that schematically illustrates a structure of an exemplary embodiment of a display device, according to the present invention.

Referring to FIG. 1, the display device includes a substrate 10, a first conductive layer 20, a first insulating layer 30, a second conductive layer 40, a second insulating layer 50 and a transparent layer 60 on the substrate 10. In one exemplary embodiment, for example, the first conductive layer 20 may be a gate layer for a gate wire or a gate electrode, and the second conductive layer 40 may be a data wire, and a data layer for a source electrode and a drain electrode.

For convenience for description, although the case where two conductive layers 20 and 40 and two insulating layers 30 and 50 are on the substrate 10 is shown, this does not limit the number of the conductive layers and the number of the insulating layers that are included in the display device. In addition, other layers such as a semiconductor layer (not shown) in addition to the conductive layers may be on the substrate 10.

As described above, the display device has a multilayer structure. In order to form a plurality of switching elements and a plurality of signal lines in the multilayer structure of the display device, the conductive layers of different layers may be physically and/or electrically connected to each other, or the conductive layer may be connected to an outside of the multilayer structure of the display device. A, B, C and D regions in FIG. 1 schematically illustrate the case where a contact hole and a contact portion connect the conductive layers of different layers to each other, or connect the conductive layer to the outside in the display device.

The first conductive layer 20 includes a first conductive first sub-layer 21 in the A region, and a first conductive second sub-layer 22 in the B region which is directly adjacent to the A region. The second conductive layer 40 includes a second conductive first sub-layer 41 in the A region, a second conductive second sub-layer 43 in the C region which is directly adjacent to the B region, and a second conductive third sub-layer 44 in the D region which is directly adjacent to the C region.

The first conductive sub-layers 21 and 22 in different regions may be connected or may not be connected to each other. The second conductive sub-layers 41, 43, and 44 in different regions may be connected or may not be connected to each other.

The first and second conductive layers 20 and 40 on the substrate 10 may be connected to the outside of the display device, or the first and second conductive layers 20 and 40 on different layers of the multilayer structure may be connected to each other. For this connection, contact holes C1, C2, C3, C4, and C5 are expose portions of the first and second conductive layers 20 and 40, and the transparent layer 60 includes first to fourth contact members 61, 62, 63, and 64. The contact holes C1, C2, C3, C4, and C5 are extended completely through a thickness of the first and second insulating layers 30 and 50 overlapping the first and second conductive layers 20 and 40, respectively, to expose the portions of the first and second conductive layers 20 and 40. Where each of the first and second insulating layers 30 and 50 defines a portion of the contact holes C1, C2, C3, C4, and C5, the respective contact holes in the first and second insulating layers 30 and 50 aligned with each other to form the contact holes C1, C2, C3, C4, and C5.

The transparent layer 60 includes the first to third contact members 61, 62, and 63 in the A to C regions, respectively, and a pixel electrode 64 as the fourth contact member in the D region. The pixel electrode 64 includes a fourth contact first sub-member 64a contacting the second conductive third sub-layer 44, and a fourth contact second sub-member 64b except for the fourth contact first sub-member 64a. The first to fourth contact members 61 to 64 may each be a single, unitary, indivisible member, such they extend continuously as described above.

The transparent layer 60 may include indium-tin-oxide ("ITO") or indium-zinc-oxide ("IZO"). ITO may be amorphous-ITO ("a-ITO").

In the A region, the first conductive first sub-layer 21 and second conductive first sub-layer 41 are electrically connected to each other. The contact holes C1 and C2 expose portions of the conductive sub-layers 21 and 41, and the first contact member 61 extends continuously from contact hole C1 to contact hole C2, such that the first contact member 61 covers (e.g., contacts and overlaps) exposed surfaces of the multilayer structure in the contact holes C1 and C2. The first contact member 61 may be a single, unitary, indivisible member, such that is extends continuously as described above.

In the case of the B region, the first conductive second sub-layer 22 may be connected to the outside of the display device. The contact hole C3 exposes portions of the first conductive second sub-layer 22. The second contact member 62 extends to cover (e.g., contact and overlap) exposed surfaces of the multilayer structure in the contact hole C3.

In the case of the C region, the second conductive second sub-layer 43 may be connected to the outside of the display device. The contact holes C4 exposes portions of the second conductive second sub-layer 43. The third contact member 63 extends to cover (e.g., contact and overlap) exposed surfaces of the multilayer structure in the contact hole C4.

In the case of the D region, the second conductive third sub-layer 44 is electrically connected to the pixel electrode 64. The contact hole C5 exposes portions of the second conductive third sub-layer 44. The pixel electrode 64 extends to cover (e.g., contact and overlap) exposed surfaces of the multilayer structure in the contact hole C5.

Films of the different layers within the multilayer structure may include different materials, such that the films of different layers may have different refractive indexes. In the case where dissipation interference occurs by reflected light generated at the interface of the layers having different refractive indexes, it is possible to maximize transmittance. Therefore, it is possible to maximize the transmittance by controlling the thickness of the layer. However, the layer that has the thickness capable of being controlled is limited to the transparent layer 60 that includes the pixel electrode 64.

Figure 2:
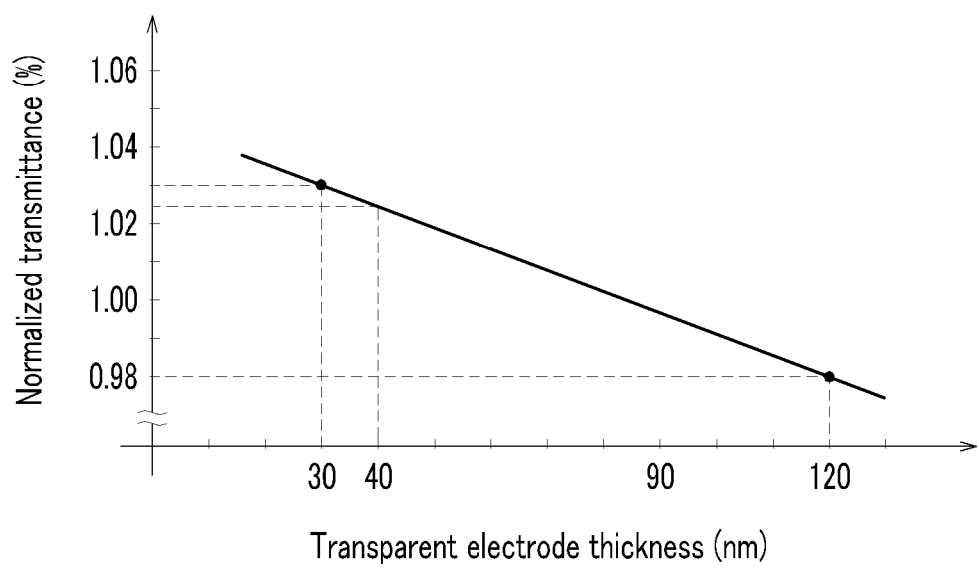
FIG. 2 is a graph that illustrates an exemplary embodiment of transmittance with respect to a thickness of a pixel electrode.

FIG. 2 is a graph that illustrates an exemplary embodiment of transmittance in percent (%) with respect to a thickness of a pixel electrode in nanometers (nm).

Referring to FIG. 2, if the thickness of the pixel electrode decreases, the transmittance is improved. In the case where the thickness of the pixel electrode is about 30 nm, the transmittance is improved by 2% to 4%. Therefore, it is possible to improve the transmittance of the display device by forming the thickness of the pixel electrode to about 40 nm or less.

Referring to FIG. 1, in order to reduce the thickness of the pixel electrode 64, reduction of the thickness of the transparent layer 60 is required.

However, the transparent layer 60 is also used as the first to fourth contact members 61, 62, 63, and 64a. In the case where the thickness of the transparent layer 60 is reduced, there may occur the problem in that the transparent layer 60 is broken in the contact holes C1, C2, C3, C4, and C5. As compared to the thickness of the transparent layer 60, in the case where the depth of the contact holes C1, C2, C3, C4, and C5 is excessively large and/or the inclination of the side walls of the contact holes C1, C2, C3, C4, and C5 is excessively steep, the transparent layer 60 may be disconnected in the contact holes C1, C2, C3, C4, and C5. In the case where the transparent layer 60 is disconnected in the contact holes C1, C2, C3, C4, and C5, the connection between the first and second conductive layers 20 and 40 and the outside of the display device, or between the first and second conductive layers 20 and 40 themselves, may be broken, such that there may be a problem in transmission of signals within the display device. This may cause a problem of defects in reliability of the display device.

Hereinafter, a method for solving the connection defect problem between the conductive layers while reducing the thickness of the pixel electrode, will be described.

A pixel electrode, a contact hole and a contact portion in the contact hole are on the substrate. The thickness of the contact portion may be different from the thickness of the pixel electrode. Thicknesses are taken perpendicular to the substrate. That is, the thickness of the contact portion may be increased and the thickness of the pixel electrode may be decreased, independent from each other. The thickness of the pixel electrode may be about 40 nm or less, and the thickness of the contact portion may be about 40 nm or more. In one exemplary embodiment, the thickness of the contact portion may be larger than the thickness of the pixel electrode by about 10 nm or more.

By this configuration, the transmittance within the display device may be maximized and the connection defect problem that is generated in the contact hole may be solved by reducing the thickness of the pixel electrode.

FIGS. 3 to 8 illustrate exemplary embodiments of structures of the contact portion having a larger thickness than that of the pixel electrode according to the present invention.

Figure 3:
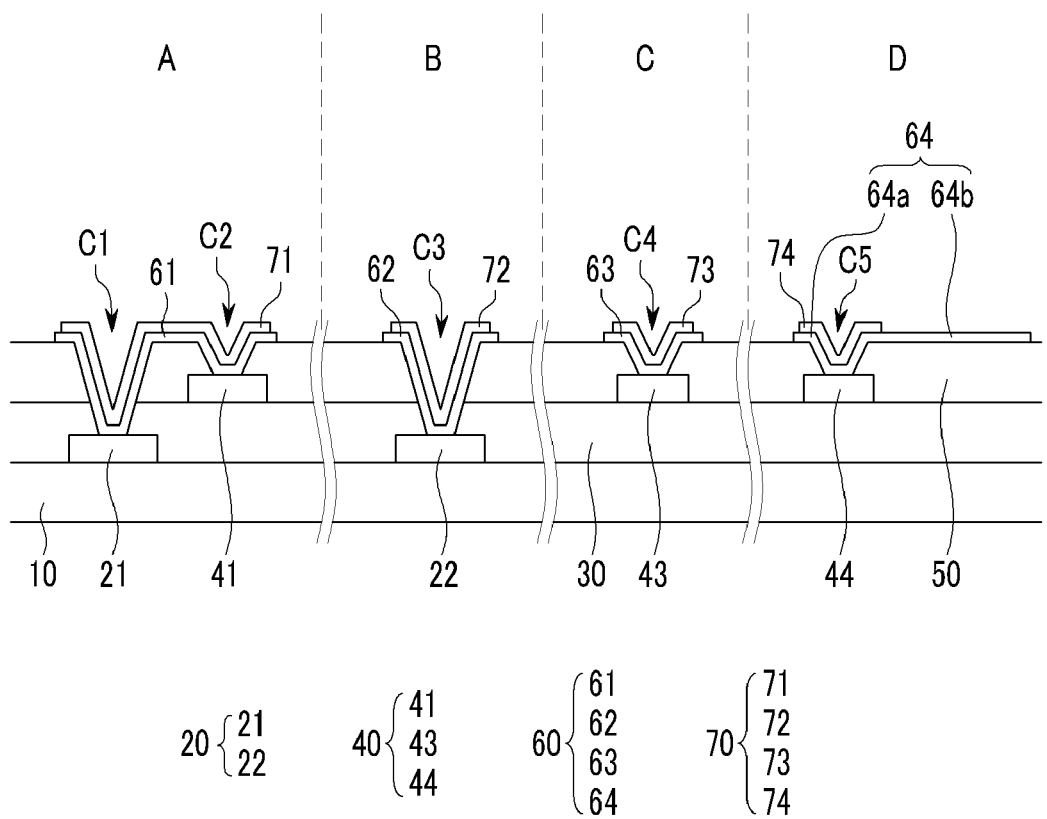
FIG. 3 is a cross-sectional view that schematically illustrates another exemplary embodiment of a structure of a display device according to the present invention.

FIG. 3 is a cross-sectional view that schematically illustrates a structure of another exemplary embodiment of a display device according to the present invention.

Referring to FIG. 3, the display device includes the first transparent layer 60 and a third conductive layer 70 in a contact hole.

The first transparent layer 60 includes the first to third contact members 61, 62, and 63 in the A to C regions, respectively, and the pixel electrode 64 in the D region. The fourth contact member 64 includes the fourth contact first sub-member 64a contacting the second conductive third sub-layer 44, and the fourth contact second sub-member 64b except for the fourth contact first sub-member 64a.

The third conductive layer 70 includes first to fourth auxiliary members 71, 72, 73, and 74 in the A to D regions, respectively. In the A region, the first auxiliary member 71 continuously extends from the contact hole C1 to the contact hole C2, such that the first auxiliary member 71 overlaps a portion of the first contact member 61. In the B and C regions, the second and third auxiliary members 72 and 73 overlap portions of the second and third contact members 62 and 63 in the contact holes C3 and C4, respectively. The first to fourth auxiliary member 71 to 74 may each be a single, unitary, indivisible member, such they extend continuously as described above.

In the D region, the fourth auxiliary member 74 is overlapping only the fourth contact first sub-member 64a. The structure in FIG. 3 is substantially the same as the display device of FIG. 1 with the exception of the third conductive layer 70, and repetitive descriptions will be omitted.

A first thickness of layers on the second insulating layer 50 in an area of the fourth contact second sub-member 64b, is defined solely by a thickness of the fourth contact second sub-member 64b. A second thickness of layers on the second insulating layer 50 in an area of the fourth contact first sub-member 64a, is defined by a total of a thickness of the fourth contact first sub-member 64a and the fourth auxiliary layer 74.

The final pixel electrode of the display device in the exemplary embodiment is solely defined by the fourth contact second sub-member 64b, and does not include the fourth contact first sub-member 64a. Therefore, a thickness of the final pixel electrode is less than a thickness of the first to fourth contact members 61-64a overlapping the first to fourth auxiliary layers 71 to 74 respectively. By reducing the thickness of the final pixel electrode and maintaining a larger thickness of other contact members, the transmittance within the display device may be maximized and the connection defect problem that is generated in the contact hole may be solved.

FIGS. 4 to 7 illustrate an exemplary embodiment of a manufacturing method of the display device of FIG. 3.

Figure 4:
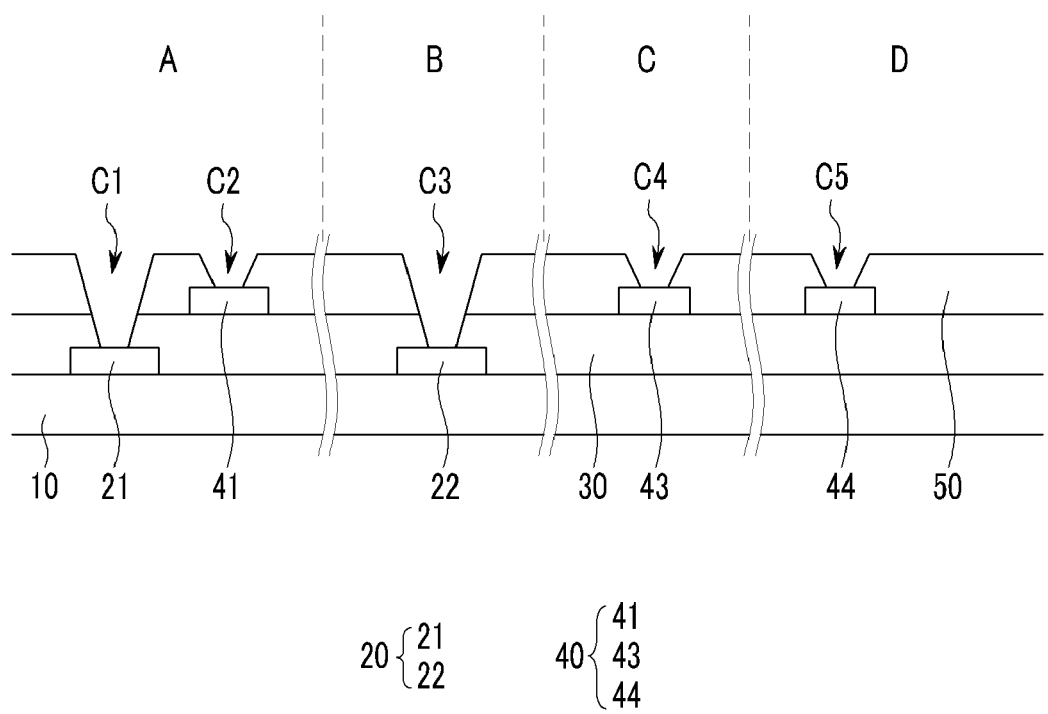
FIGS. 4 to 7 illustrate an exemplary embodiment of a manufacturing method of the display device of FIG. 3.

Referring to FIG. 4, the first conductive layer 20 is formed on the substrate 10, and the first insulating layer 30 is layered thereon. The second conductive layer 40 is formed on the first insulating layer 30, and the second insulating layer 50 is layered thereon. The contact holes C1, C2, C3, C4, and C5 are formed extending through thicknesses of the first and second insulating layers 30 and 50, respectively, and expose portions of the first and second conductive layers 20 and 40. The contact holes C1, C2, C3, C4, and C5 may be formed through photolithography and etching processes.

In the A region, the contact hole C1 is formed to expose the portion of the first conductive first sub-layer 21, and the contact hole C2 is formed to expose the portion of the second conductive first sub-layer 41.

In the case of the B region, the contact hole C3 is formed to expose the portion of the first conductive second sub-layer 22.

In the case of the C, and D regions, the contact holes C4 and C5 are formed to expose the portions of the second conductive second and third sub-layers 43 and 44.

Figure 5:
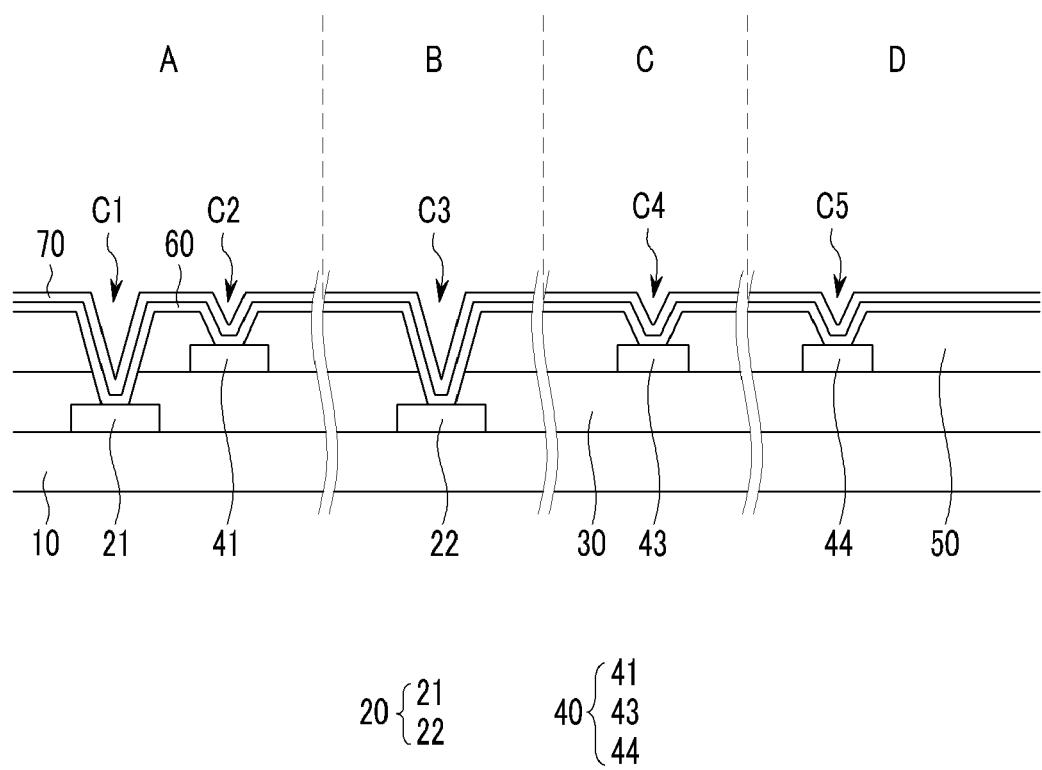

Referring to FIG. 5, the first transparent layer 60 and the third conductive layer 70 are formed on the second insulating layer 50, such as be sputtering a transparent and conductive material, respectively.

Figure 6:
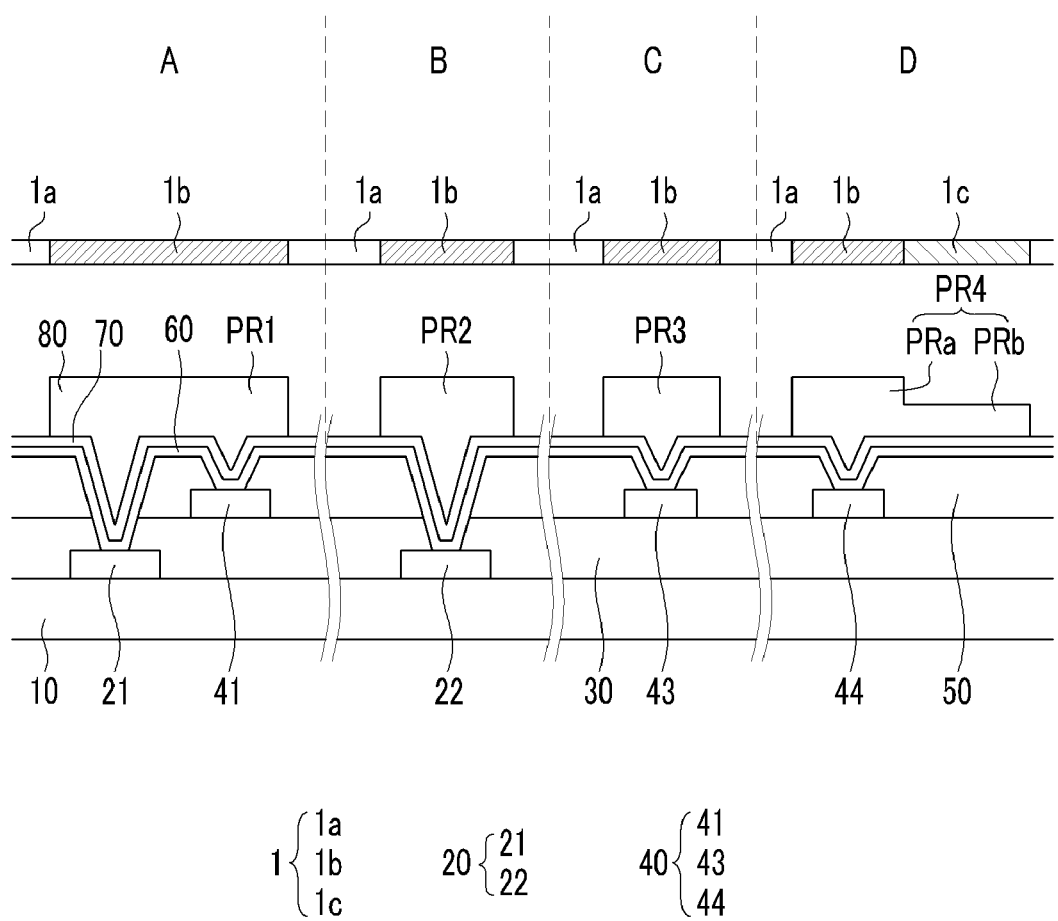

Referring to FIG. 6, a photoresist ("PR") layer is formed on the third conductive layer 70, and a PR pattern 80 is formed by removing a portion of the PR layer through a mask 1.

In the case where the PR is positive, the mask 1 includes a complete transmitting part 1a that allows light to penetrate, a light blocking part 1b that completely blocks light, and a semi-transmitting part 1c that allows a portion of light to penetrate. The semi-transmitting part 1c may be a half tone pattern or a slit pattern.

In the case of A, B and C regions, the mask 1 may include the complete transmitting part 1a and the light blocking part 1b, and the PR patterns PR1, PR2, and PR3 may be formed.

In the case of the D region, the mask 1 may include the complete transmitting part 1a, the light blocking part 1b and the semi-transmitting part 1c, and the PR pattern PR4 may be formed. The PR pattern PR4 may include a first PR pattern PRa and a second PR pattern PRb that is thinner than a first PR sub-pattern PRa. The first PR sub-pattern PRa may correspond to the light blocking part 1b, and the second PR sub-pattern PRb may correspond to the semi-transmitting part 1c.

Figure 7:
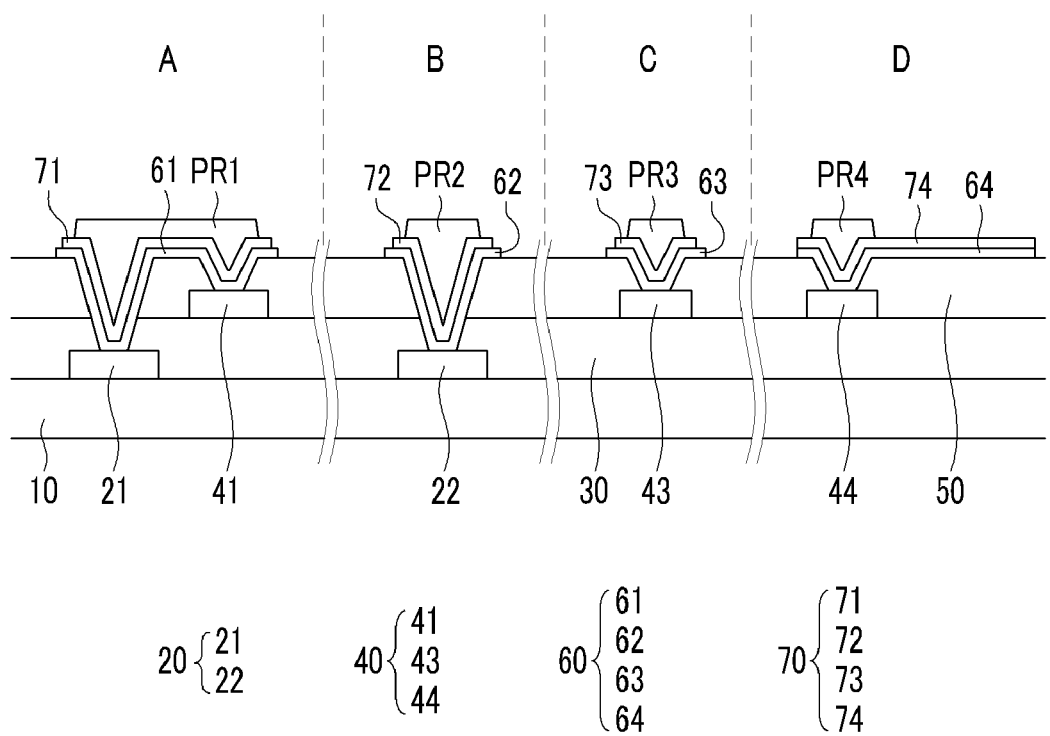

Referring to FIG. 7, the first transparent layer 60 and the third conductive layer 70 are etched using the PR pattern. In the portion in which there is no PR pattern, the first transparent layer 60 and the third conductive layer 70 are etched in one etching operation. This is called an etch/back ("E/B") process.

The PR patterns PR1, PR2, PR3, and PR4 fill the contact holes C1, C2, C3, C4 and C5 having the first transparent layer 60 and the third conductive layer 70 therein, respectively. An upper surface of the PR patterns extend further than an upper surface of the third conductive layer 70.

In the case of the D region, the PR pattern PR4 is formed by removing a portion of the first PR sub-pattern PRa of FIG. 6, and the third conductive layer 70 is exposed by completely removing the second PR sub pattern PRb.

Of the first transparent layer 60 and the third conductive layer 70, the third conductive layer 70 is selectively etched according to the PR patterns to form first to fourth auxiliary members 71 to 74. This is called a selectively etching process.

In the case of the D region, the fourth contact sub-member 64b (as a final pixel electrode) is exposed by further removing a portion of the third conductive layer 70 to finally form the fourth auxiliary member 74. In the contact holes C1, C2, C3, C4 and C5, the third conductive layer 70 is formed on and overlapping the first transparent layer 60.

The first transparent layer 60 and the third conductive layer 70 may be formed of different materials, so that the selective etching can be performed. In one exemplary embodiment, the first transparent layer 60 may be formed of ITO, and the third conductive layer 70, may be formed of IZO. As another exemplary embodiment, the first transparent layer 60 may be formed of ITO, and the third conductive layer 70 may be formed of a metal layer.

In the case where the first transparent layer 60 is formed of ITO and the third conductive layer 70 is formed of IZO, a megasonic-agitated module ("MAM") integrated etchant may be used as an etchant. In the case where the MAM integrated etchant is used, the ratio of the etch rate of the third conductive layer 70 to the etch rate of the first transparent layer 60 may be about 8:1 or more.

In the case where the MAM integrated etchant is used and the application temperature is about 40 Celsius (° C.), the etch rate of the IZO layer and etch rate of the ITO layer are described in the following Table.

TABLE 1

| IZO | ITO |
|---|---|
| 14.7 | 1.8-2.3 |

As described above, the thickness of the final pixel electrode may be different from the thickness of the final contact portions by forming the final contact portions including double layers including the first to fourth contact members 61, 62, 63, and 64a overlapping the first to fourth auxiliary members 71, 72, 73, and 74, respectively, and forming the final pixel electrode to include only a single layer of the fourth contact second sub-layer 64b.

Through this, the transmittance may be maximized and the connection defect problem that is generated in the contact holes C1, C2, C3, C4, and C5 may be solved by reducing the thickness of the final pixel electrode while maintaining a larger thickness of the other contact portions. However, a double layer sputtering process, an E/B process, and a selective etching process may be added.

In an exemplary embodiment, the structure of the display device of FIG. 3 may be formed by a printing method. In this case, the first transparent layer 60 may be formed on the second insulating layer 50 by the sputtering process. The third conductive layer 70 may be formed on only the contact hole by a printing method. By the photolithography process and etching process, the double layer is formed on the second insulating layer 50 in the contact hole, and the final pixel electrode including only the fourth contact second sub-member 64b may be formed of the first transparent layer 60 directly on the second insulating layer 50. In this case, in the photolithography process, it is not necessary to use the mask that includes the half tone pattern or slit pattern. The etching process may be performed in one operation without the selective etching.

In addition, the first transparent layer 60 and third conductive layer 70 may be formed by the printing method.

Figure 8:
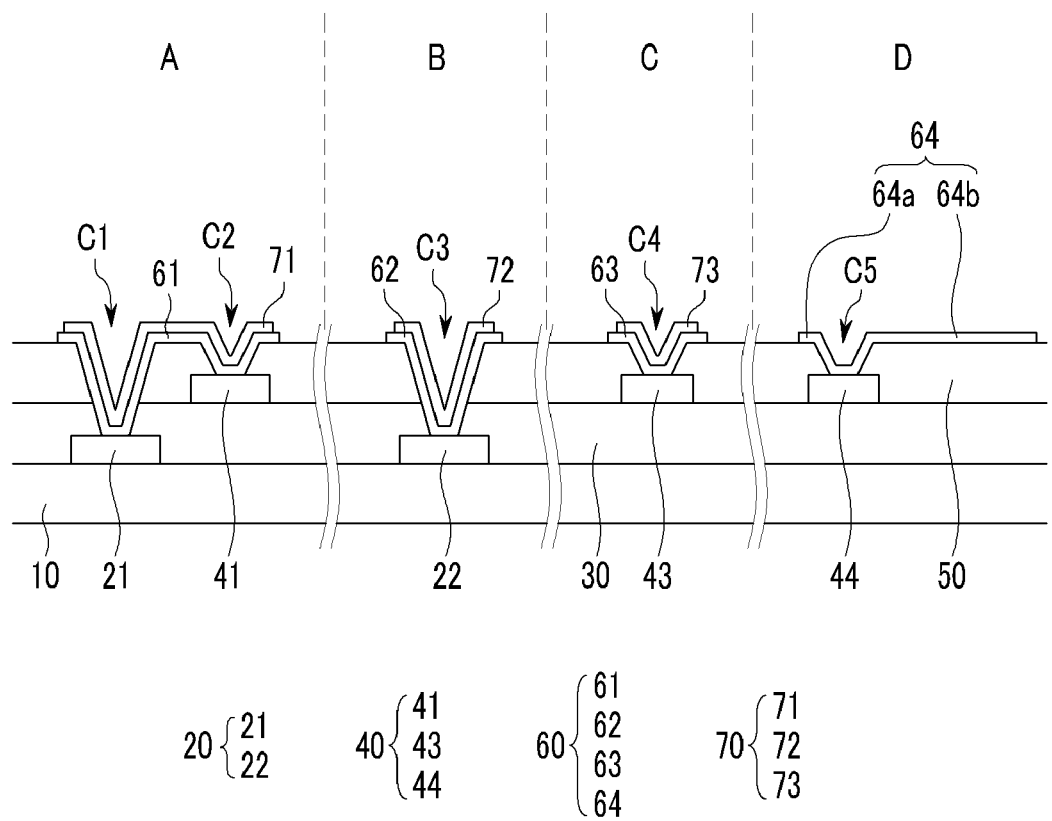
FIG. 8 is a cross-sectional view that schematically illustrates a structure of a modified exemplary embodiment of the display device of FIG. 3, according to the present invention.

FIG. 8 is a cross-sectional view that schematically illustrates a structure of modified exemplary embodiment of the display device of FIG. 3.

Referring to FIG. 8, the A, B, and C regions of the display device include contact members formed by the first to third contact members 61, 62, and 63 overlapping the first to third auxiliary members 71, 72, and 73, respectively. Unlike FIG. 3, in the D region, only the pixel electrode 64 is directly on the second insulating layer 50. The pixel electrode 64 includes both the fourth contact first sub-layer 64a and the fourth contact second sub-layer 64b. The first to third auxiliary layers 71, 72, and 73 of the third conductive layer 70 may only be in the A, B, C regions, and not in the D region, such as by using the printing method.

Figure 9:
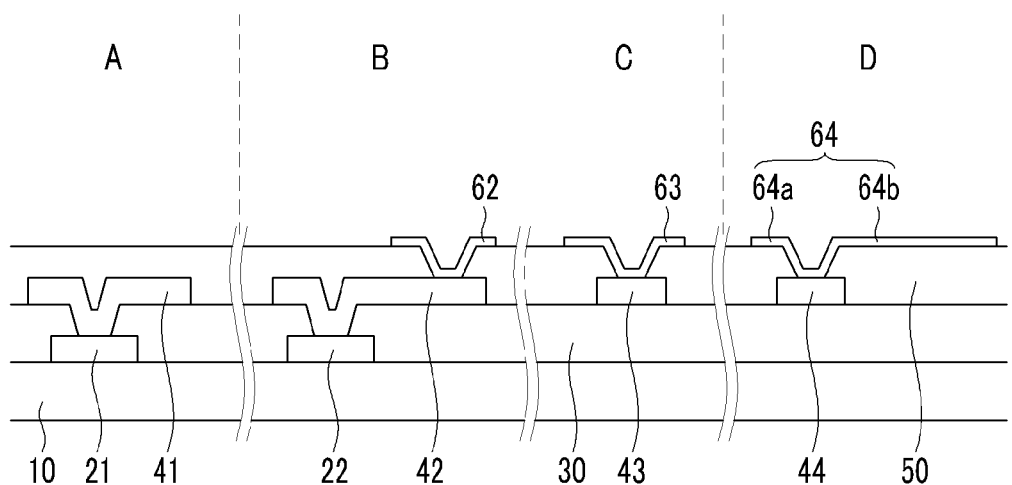
FIG. 9 is a cross-sectional view that schematically illustrates a structure of another exemplary embodiment of a display device according to the present invention.

FIG. 9 is a cross-sectional view that schematically illustrates a structure of another exemplary embodiment of a display device according to the present invention.

Referring to FIG. 9, the first conductive first sub-layer 21 is directly connected to the second conductive first sub-layer 41 in the A region. In the B region, the first conductive second sub-layer 22 is directly connected to the second conductive second sub-layer 42, and the second conductive second sub-layer 42 is connected to the second contact member 62. The C and D regions are the same as the C and D regions of FIG. 1.

In an exemplary embodiment, the A region may be formed by the following procedure.

The first conductive first sub-layer 21 is formed on the substrate 10, and the first insulating layer 30 is formed on the first conductive first sub-layer 21. A single contact hole is formed to expose the first conductive first sub-layer 21. The single contact hole does not extend through a thickness of the second insulating layer 50. The second conductive first sub-layer 41 is formed to fill the single contact hole and to contact the exposed first conductive first sub-layer 21. The second insulating layer 50 is formed on the second conductive first sub-layer 41. Since the first conductive first sub-layer 21 and second conductive first sub-layer 41 are directly connected to each other, unlike FIG. 1, the single contact hole is formed to expose the second conductive first sub-layer 41, and it is not necessary to use the first contact member 61.

Accordingly, in the A region, even though the thickness of the pixel electrode 64 including both the fourth contact first sub-layer 64a and the fourth contact second sub-layer 64b is reduced, the connection defect problem of the contact members is not generated.

In the exemplary embodiment, the B region may be formed by the following procedure.

The first conductive second sub-layer 22 is formed on the substrate 10, and the first insulating layer 30 is formed on the first conductive second sub-layer 22. A single contact hole is formed to expose the first conductive second sub-layer 22. The single contact hole does not extend through a thickness of the second insulating layer 50. The second conductive second sub-layer 42 is formed to fill a portion of the single contact hole and to contact the exposed first conductive second sub-layer 22. The second insulating layer 50 is formed on the second conductive second sub-layer 42. The single contact hole is formed to expose surfaces of the second conductive second sub-layer 42, and the second contact member 62 is formed to fill a remainder of the single contact hole. Unlike FIG. 1, the first conductive second sub-layer 22 may be connected to the outside of the display device directly through the second conductive second sub-layer 42 and the second contact member 62.

When the second conductive second sub-layer 42 of the B region connects the first conductive second sub-layer 22 to the outside of the display device, the second conductive second sub-layer 42 may be inserted into the single contact hole only in order to reduce the depth of the contact hole. In this case, the second conductive second sub-layer 42 of the B region may not be connected to the other second conductive sub-layers 41, 43, and 44 of the other regions A, C and D.

As described above, it is possible to reduce the depth of the single contact hole by not forming the contact hole extending through the thickness of the second insulating layer 50 to expose the first conductive layer 20. Accordingly, in the D region, even though the thickness of the pixel electrode 64 is reduced, it is possible to prevent the connection defect problem of the contact members.

Figure 10:
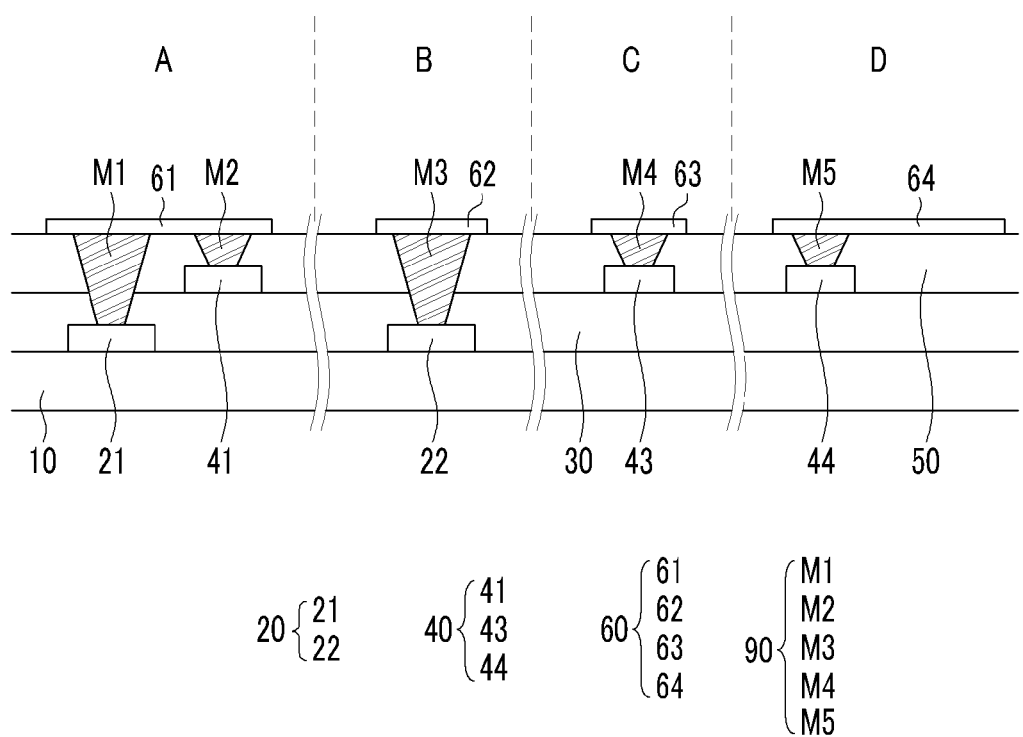
FIG. 10 is a cross-sectional view that schematically illustrates a structure of another exemplary embodiment of a display device according to the present invention.

FIG. 10 is a cross-sectional view that schematically illustrates a structure of another exemplary embodiment of a display device according to the present invention.

Referring to FIG. 10, the contact holes C1, C2, C3, C4 and C5 are filled by a metal layer 90 including first to fifth metal sub-layers M1, M2, M3, M4, and M5. In an exemplary embodiment, the first to fifth metal sub-layers M1, M2, M3, M4, and M5 may be formed by using an electroless plating method. The first to fifth metal sub-layers M1, M2, M3, M4, and M5 may include metal materials such as Ni, Co, Cu, Zn, Ag, Pt, and Pd.

The first to fifth metal sub-layers M1, M2, M3, M4, and M5 may completely fill the contact holes C1, C2, C3, C4 and C5, such that upper surfaces of the first to fifth metal sub-layers M1, M2, M3, M4, and M5 are coplanar with an upper surface of the second insulating layer 50. Alternatively, the upper surfaces of the first to fifth metal sub-layers M1, M2, M3, M4, and M5 may be higher or lower than the upper surface of the second insulating layer 50. When the first to fifth metal sub-layers M1, M2, M3, M4, and M5 completely fill the contact holes C1, C2, C3, C4 and C5, the first to fifth metal sub-layers M1, M2, M3, M4, and M5 are between the first and second conductive layers 20 and 40, and the first transparent layer 60.

Lateral surfaces of the second insulating layer 50 that form side walls of the contact holes C1, C2, C3, C4 and C5 are tapered with respect to a planar surface of the substrate 10. However, the present invention is not limited thereto. Alternatively, the lateral surfaces of the second insulating layer 50 that form the side walls of the contact holes C1, C2, C3, C4 and C5 may not be tapered or almost vertical (e.g., perpendicular) with respect to the planar surface of the substrate 10.

The transparent layer 60 is on the second insulating layer 50, such that the transparent layer 60 contacts the upper surface of the second insulating layer 50. The transparent layer 60 is electrically connected to the first and second conductive layers 20 and 40 through the metal layer 90.

As described above, even though the thickness of the transparent layer 60 is reduced, it is possible to prevent the connection defect problem of the contact members 61, 62, 63, and 64 in the contact hole by filling the contact holes C1, C2, C3, C4 and C5 by the first to fifth metal sub-layers M1, M2, M3, M4, and M5.

Figure 11:
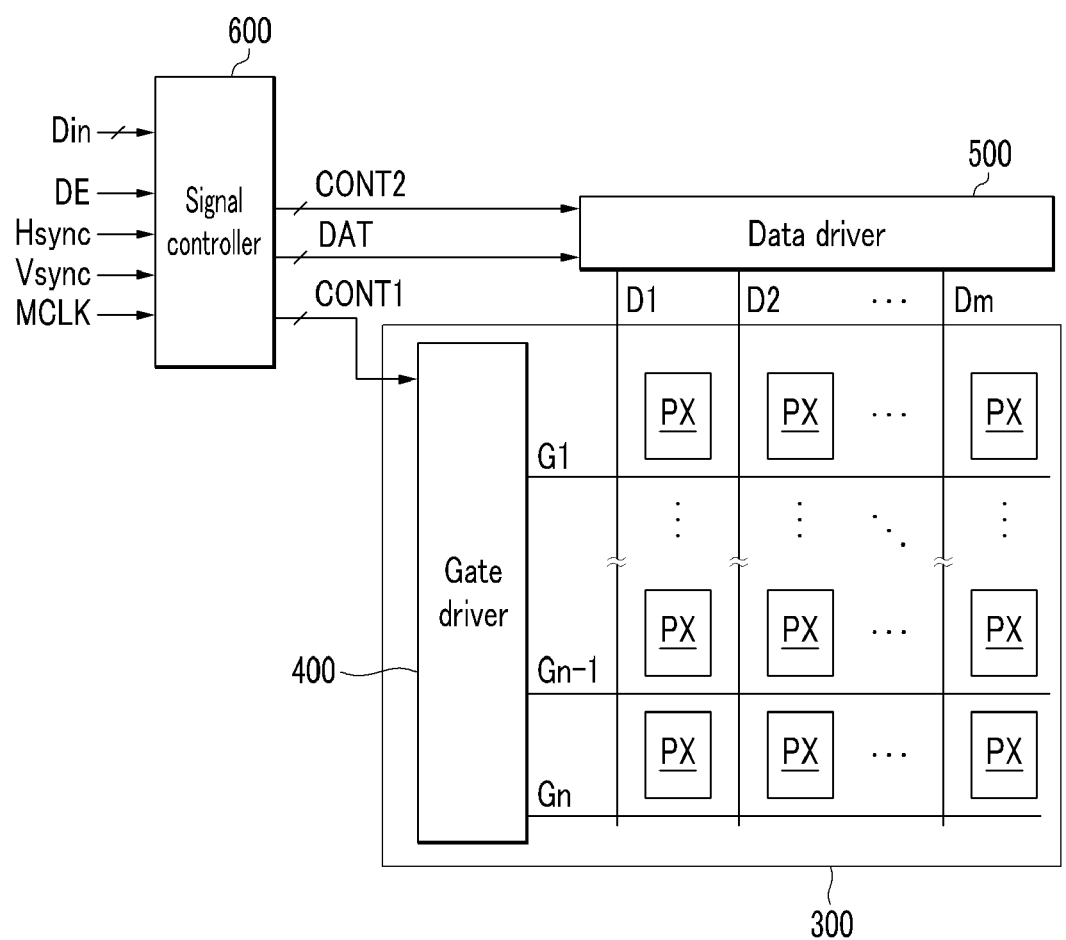
FIG. 11 illustrates a structure of another exemplary embodiment of a display device according to the present invention.

FIG. 11 illustrates a structure of another exemplary embodiment of a display device according to the present invention.

Referring to FIG. 11, the display device includes a display panel 300 and a gate driver 400, a data driver 500 connected thereto, and a signal controller 600 for controlling the display panel 300, the gate driver 400 and the data driver 500.

The display panel 300, when it is viewed in the plan view, includes a plurality of signal lines G1-Gn and D1-Dm, and a plurality of pixels PX that are connected to the plurality of signal lines G1-Gn and D1-Dm and arranged in approximately a matrix form.

The signal lines G1-Gn and D1-Dm include a plurality of gate lines G1-Gn that transfer a gate signal (referred to as "scanning signal"), and a plurality of data lines D1-Dm that transfer a data signal.

Each pixel PX includes a switching element (not shown) that is connected to the signal lines G1-Gn and D1-Dm.

The gate driver 400 is connected to the gate lines G1-Gn, and applies the gate signal formed by the combination of gate-on voltage Von and gate-off voltage Voff to the gate lines G1-Gn. The gate driver 400 is substantially a shift register, includes a plurality of stages that are connected to the gate lines G1-Gn, and is formed during a same process as the switching element of the pixel PX, such that the gate driver 400 may be integrated at an edge of the display panel 300.

The data driver 500 is connected to the data lines D1-Dm of the display panel 300, and applies the data signal to the data lines D1-Dm.

The signal controller 600 controls the gate driver 400 and data driver 500.

The data driver and the signal controller 500 and 600 may be directly mounted on the display panel 300 in a form of an integrated circuit ("IC") chip, attached to the display panel 300 in a form of a tape carrier package ("TCP") by being mounted on the flexible printed circuit film (not shown), or mounted on a separate printed circuit board ("PCB") (not shown). Alternatively, like the gate driver 400, the data driver and the signal controller 500 and 600 may be integrated on the display panel 300 in conjunction with the signal lines G1-Gn and D1-Dm, and the switching elements.

Then, an operation of the display device will be described.

The signal controller 600 receives an input image signal Din from an external graphic controller (not shown), and an input control signal for controlling a display of the input image signal Din. The input control signal, may include, but is not limited to, a vertical synchronization signal Vsync, a horizontal synchronization signal Hsync, a main clock MCLK, and a data enable signal DE.

The signal controller 600 appropriately processes the input image signal Din on the basis of the input control signal under the operating condition of the display panel 300. After a gate control signal CONT1 and a data control signal CONT2 are generated by the signal controller 600, the gate control signal CONT1 is transmitted to the gate driver 400, and the data control signal CONT2 and a processed image signal DAT are transmitted to the data driver 500.

The gate control signal CONT1 includes a scanning start signal SW that indicates scanning starting and at least one clock signal that controls an output cycle of the gate-on voltage Von. The gate control signal CONT1 may further include an output enable signal OE that limits a maintaining time of the gate-on voltage Von.

The data control signal CONT2 includes a horizontal synchronization start signal STH that indicates transmission starting of the image data with respects to the pixel PX of one row, and a load signal LOAD and a data clock signal HCLK that applies the data signal to the data lines D1-Dm. The data control signal CONT2 may further include an inversion signal RVS that inverses voltage polarity of the data signal with respect to the common voltage Vcom (hereinafter, referred to as 'polarity of the data signal').

According to the data control signal CONT2 from the signal controller 600, the data driver 500 receives the digital image signal DAT with respect to the pixels PX of one row, selects a gray voltage that corresponds to each digital image signal DAT, converts the digital image signal DAT into an analog data signal, and applies the converted analog data signal to the corresponding data lines D1-Dm.

The gate driver 400 applies the gate-on voltage Von to the gate lines G1-Gn and turns on the switching elements that are connected to the gate lines G1-Gn according to the gate control signal CONT1 from the signal controller 600. Then, the data signal that is applied to the data lines D1-Dm is applied to the corresponding pixels PX through the turned-on switching elements.

By repeating this process in one horizontal period ("1H"), which is the same as one period of the horizontal synchronizing signal Hsync and data enable signal DE as a unit, an image of one frame is displayed by the display panel 300 by sequentially applying the gate-on voltage Von to all gate lines G1-Gn and applying the data signal to all pixels PX.

If one frame is finished, a next frame is started, and the state of the inversion signal RVS that is applied to the data driver 500 is controlled ("frame inversion") so that the polarity of the data signal that is applied to each pixel PX is opposite to the polarity of the previous frame. In this case, the polarity of the data signal that flows through one data line is changed (e.g., row inversion, dot inversion), or the polarities of the data signals that are applied to one pixel row may be different from each other (e.g., column inversion, dot inversion) according to the characteristic of the inversion signal RVS in one frame.

Figure 12:
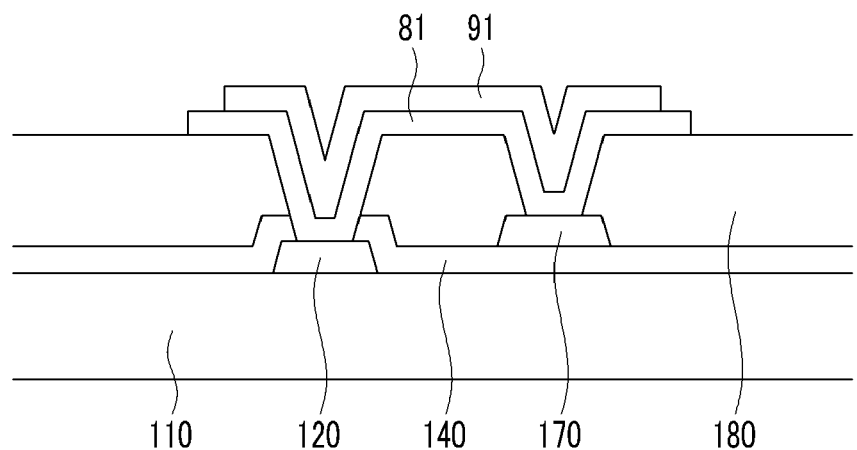
FIG. 12 is a cross-sectional view of a portion of an exemplary embodiment of a gate driver that is shown in FIG. 11.

FIG. 12 is a cross-sectional view of a portion of an exemplary embodiment of a gate driver that is shown in FIG. 11.

Referring to FIG. 12, a gate layer 120 is on an insulation substrate 110. The insulation substrate 110 may include transparent glass or plastic. The gate layer 120 may include one side terminal of a plurality of transistors in the gate driver 400.

A gate insulating layer 140 is on the gate layer 120. A data layer 170 is on the gate insulating layer 140. The data layer 170 may include at least one terminals of a plurality of transistors of the gate driver.

In one exemplary embodiment, for example, the gate layer 120 is a gate electrode of a first transistor, and a data layer 170 is a source electrode or drain electrode of a second transistor. The first transistor and the second transistor may be different transistors.

A passivation layer 180 is on the data layer 170. In order to connect the gate layer and the data layer 120 and 170 to each other, a contact hole is extended completely through a thickness of the passivation layer 180 on the gate layer and the data layer 120 and 170, and a contact member 81 is in the contact hole to extend from the gate layer 120 to the data layer 170. The contact member 81 is in a same layer as a pixel electrode, and may include a same material as the pixel electrode. A thickness of the contact member 81 may be about 40 nm or less. An auxiliary member 91 is on and overlapping the contact member 81.

The structure of FIG. 12 corresponds to the structure of the A region of FIG. 3. FIG. 12 illustrates the application of the exemplary embodiment of FIG. 3 in which the double layer is in the contact hole in the gate driver, but the present invention is not limited thereto, and another exemplary embodiment of the invention may be applied. In the case where the gate layer 120 and data layer 170 are directly contacted by applying the exemplary embodiment of FIG. 9, it is not necessary to use the larger depth contact hole and contact members. In addition, a metal layer may be filled in the contact holes on the gate layer 120 and the contact holes on the data layer 170, and the contact members may be subsequently thereon by applying the exemplary embodiment of FIG. 10.

Figure 13:
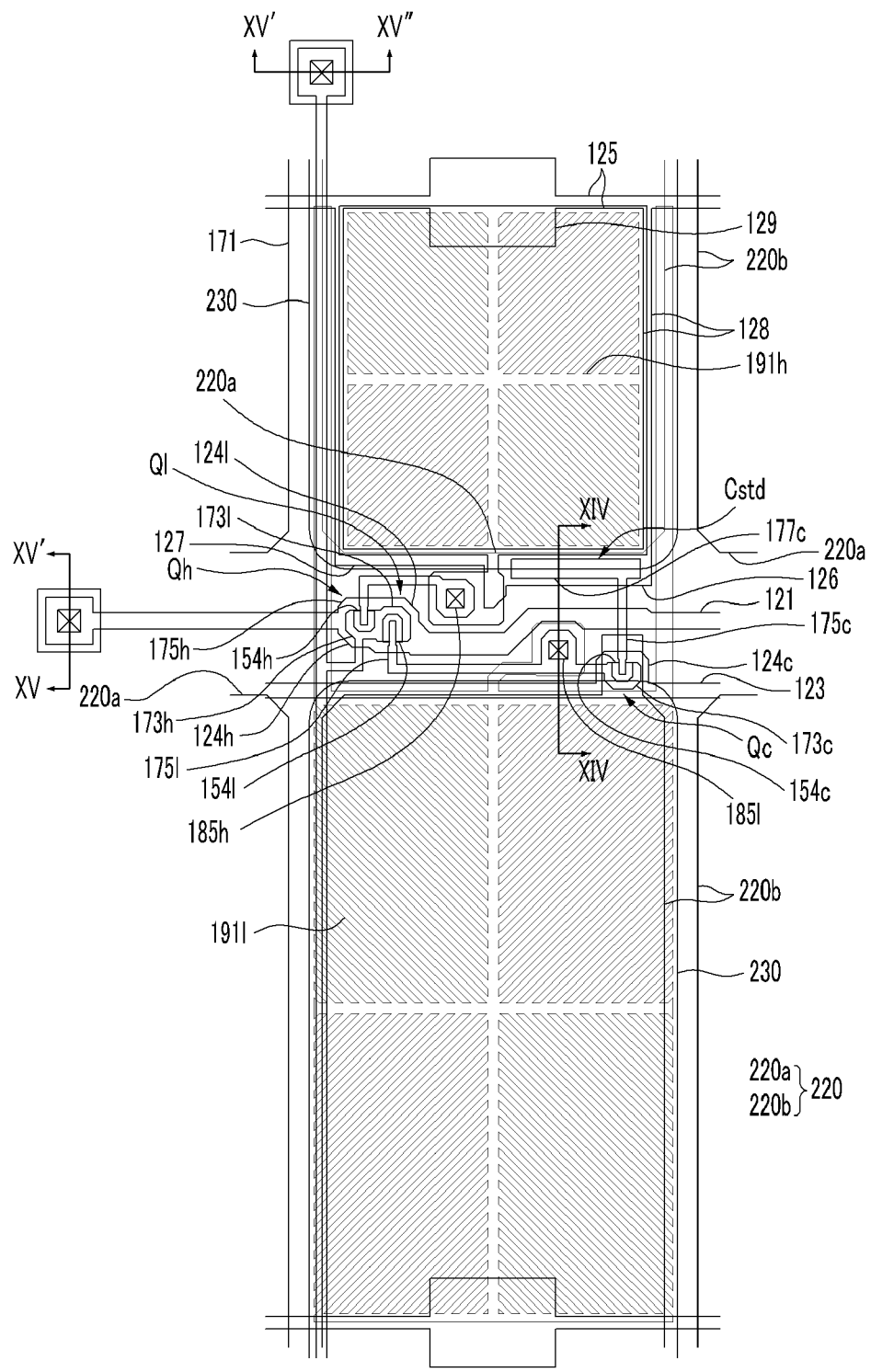
FIG. 13 is a plan view that illustrates an exemplary embodiment of a pixel electrode of a liquid crystal display, when the display device shown in FIG. 11 is a liquid crystal display.
Figure 14:
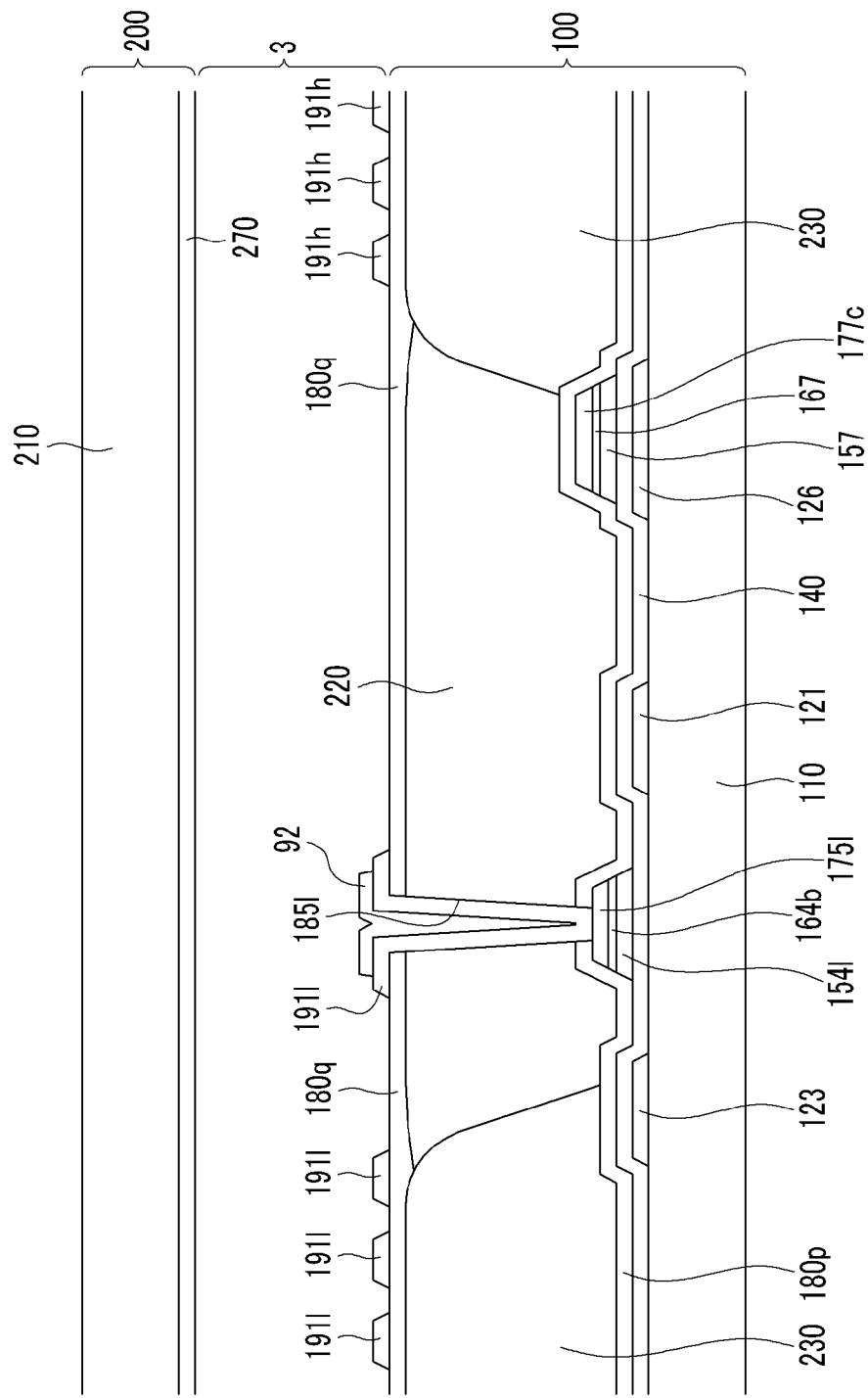
FIG. 14 is a cross-sectional view that is taken along line XIV-XIV of FIG. 13.
Figure 15:
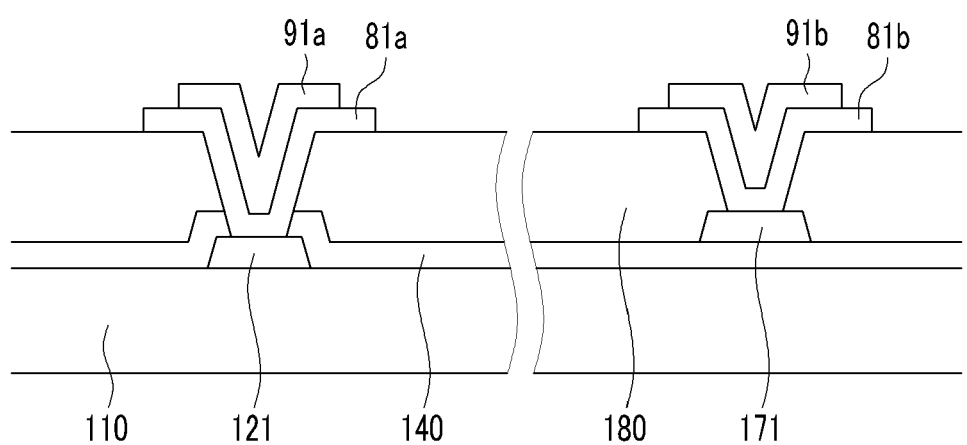
FIG. 15 is a cross-sectional view that is taken along lines XV-XV' and XV'-XV" of FIG. 13.

FIG. 13 is a plan view that illustrates an exemplary embodiment of a pixel electrode of a liquid crystal display when the display device shown in FIG. Ills a liquid crystal display, FIG. 14 is a cross-sectional view taken along line XIV-XIV of FIG. 13, and FIG. 15 is a cross-sectional view taken along lines XV-XV' and XV'-XV".

Referring to FIGS. 13 and 14, the liquid crystal display includes lower panel 100 and upper panel 200 that face each other, and a liquid crystal layer 3 interposed between two display panels 100 and 200. A polarizer (not shown) may be provided on the outer surface of the panels 100 and 200.

First, the upper panel 200 will be described.

A common electrode 270 is on an upper insulation substrate 210. The common electrode 270 may include a transparent conductor such as ITO, IZO or metal. An alignment layer (not shown) may be on the common electrode 270.

The liquid crystal layer 3 that is interposed between the lower panel 100 and the upper panel 200 includes liquid crystal molecules that have a negative dielectric anisotropy, and the liquid crystal molecules may be aligned so that long axes thereof are vertical with respect to surfaces of the two panels 100 and 200 in a state in which there is no electric field.

Next, the lower panel 100 will be described.

A plurality of gate conductors that include a plurality of gate lines 121, a plurality of voltage drop gate lines 123 and a plurality of storage electrode lines 125 are on a lower insulation substrate 110.

The gate line 121 and voltage drop gate line 123 mostly extend in a horizontal (e.g., transverse) direction and transfers a gate signal. The gate line 121 includes a first gate electrode 124h and a second gate electrode 124l that protrude upward and downward, respectively, in the plan view. The voltage drop gate line 123 includes a third gate electrode 124c that protrudes upward in the plan view. The first gate electrode 124h and the second gate electrode 124l are connected to each other to form one collective protrusion portion.

The storage electrode line 125 mostly extends in the horizontal direction and transfers a predetermined voltage such as a common voltage Vcom. The storage electrode line 125 includes a storage electrode 129 that protrudes upward and downward in the plan view, a pair of vertical portions 128 that vertically (e.g., longitudinally) extend downward with respect to the gate line 121, and a horizontal portion 127 that connects ends of a pair of vertical portions 128 to each other. The horizontal portion 127 includes a capacitive electrode 126 that are extended downward.

A gate insulating layer 140 is on the gate conductors 121, 123, and 125.

A plurality of semiconductor stripes are on the gate insulating layer 140 The semiconductor stripes may include amorphous or crystalline silicon, or the like. The semiconductor stripe mostly extends in a vertical direction, and includes first and second semiconductors 154h and 154l that extend toward the first and the second gate electrodes 124h and 124l, respectively, and are connected to each other, and a third semiconductor 154c that is connected to the second semiconductor 154l. The third semiconductor 154c extends to form a fourth semiconductor 157.

A plurality of ohmic contact stripes (not shown) are on the semiconductor stripe, a first ohmic contact (not shown) is on the first semiconductor 154h, and a second ohmic contact 164b and a third ohmic contact (not shown) are on the second semiconductor 154l and the third semiconductor 154c, respectively. The ohmic contact stripe includes a first protrusion portion (not shown) that forms a pair in conjunction with the first ohmic contact island and is disposed on the first protrusion portion of the semiconductor, a second protrusion portion (not shown) that forms a pair in conjunction with the second ohmic contact island and is disposed on the second protrusion portion of the semiconductor, and a third protrusion portion (not shown) that forms a pair in conjunction with the third ohmic contact island and is disposed on the third protrusion portion of the semiconductor. The third ohmic contact extends to form a fourth ohmic contact 167.

A data conductor that includes a plurality of data lines 171, a plurality of first drain electrodes 175h, a plurality of second drain electrodes 175l and a plurality of third drain electrodes 175c are on the ohmic contacts 164b and 167.

The data line 171 transfers a data signal and mainly extends in a vertical direction, and crosses the gate line 121 and the voltage drop gate line 123. Each data lines 171 includes a first source electrode 173h and a second source electrode 173l that extend toward the first gate electrode 124h and the second gate electrode 124l, respectively.

The first drain electrode 175h, the second drain electrode 175l and the third drain electrode 175c include wide first end portions in the plan view, and other rod-shaped second end portions. The rod-shaped second end portions of the first drain electrode 175h and the second drain electrode 175l are partially surrounded by the first source electrode 173h and the second source electrode 173l in the plan view. The wide end first portion of the second drain electrode 175l further extends to form a U-shaped third source electrode 173c. A wide end 177c of the third drain electrode 175c overlaps the capacitive electrode 126 to form the voltage drop capacitor Cstd, and the rod-shaped second end is partially surrounded by the third source electrode 173c.

The first, second, and third gate electrodes 124h, 124l, and 124c, the first, second, and third source electrodes 173h, 173l, and 173c, the first, second, and third drain electrodes 175h, 175l, and 175c and the semiconductor islands 154h, 154l, and 154c altogether form first, second, and third thin film transistors Qh, Ql and Qc, respectively. A channel of the thin film transistor is formed in each of the semiconductors 154h, 154l, and 154c between each of the source electrodes 173h, 173l and 173c and each of the drain electrodes 175h, 175l, and 175c.

The semiconductor stripe that includes the semiconductors 154h, 154l, and 154c has substantially the same flat (e.g., planar) surface shape as the data conductors 171, 175h, 175l, and 175c and ohmic contacts 164l and 167 therebeneath (e.g., overlapping), with the exception of a channel region between the source electrodes 173h, 173l, and 173c and the drain electrodes 175h, 175l, and 175c, respectively. That is, in the semiconductor stripe that includes the semiconductors 154h, 154l, and 154c, there are a space between source electrodes 173h, 173l, and 173c and drain electrodes 175h, 175l, and 175c defining a respective channel region, and a portion of the semiconductor stripe is not covered by the data conductors 171, 175h, 175l, and 175c.

A lower passivation layer 180p including an inorganic insulator such as silicon nitride or silicon oxide, is on the data conductors 171, 175h, 175l, 175c, and the exposed portion of the semiconductors 154h, 154l, and 154c.

A color filter 230 is on the lower passivation layer 180p. The color filter 230 is in most regions of the display device with the exception of regions in which the first thin film transistor Qh, the second thin film transistor Ql and the third thin film transistor Qc are disposed. However, the color filter 230 may longitudinally extend in a vertical direction along the space between the data lines 171 that are adjacent to each other. Each color filter 230 may display any one of three primary colors of red, green and blue colors.

A light blocking member 220 overlaps a region in which the color filter 230 is not disposed, and overlaps a portion of the color filter 230. The light blocking member 220 may be referred to as a black matrix, and reduces or effectively prevents light leakage. The light blocking member 220 extends along (e.g., parallel to) the gate line 121 and voltage drop gate line 123 to expand upward and downward, and includes a second light blocking member 220b that extends along a first light blocking member 220a and the data line 171 that cover the region in which the first thin film transistor Qh, the second thin film transistor Ql and the third thin film transistor Qc are disposed.

An upper passivation layer 180q is on the color filter 230 and light blocking member 220. The upper passivation layer 180q reduces or effectively prevents peeling of the color filter 230 and light blocking member 220, suppresses contamination of the liquid crystal layer 3 by an organic material of a solvent that flows from the color filter 230, so that it reduces or effectively prevents defects such as afterimages that may occur when an image is driven.

A plurality of first contact holes 185h and a plurality of second contact holes 185l are extended through thicknesses of the lower passivation layer 180p, the light blocking member 220 and the upper passivation layer 180q. The plurality of first contact holes 185h and the plurality of second contact holes 185l expose the wide end portion of the first drain electrode 175h and the wide end portion of the second drain electrode 175l.

A plurality of pixel electrodes 191 are on the upper passivation layer 180q.

Each pixel electrode 191 includes a first subpixel electrode 191h and a second subpixel electrode 191l that are separated from each other with two gate lines 121 and 123 disposed therebetween. The first subpixel electrode 191h and a second subpixel electrode 191l are above and beneath the pixel area with respect to the center of the gate lines 121 and 123, to be adjacent to each other in a column (e.g., vertical) direction in the plan view.

The first subpixel electrode 191h and the second subpixel electrode 191l include a circumference stem portion that surrounds the circumference thereof. A vertical portion of the circumference stem portion extends parallel to the data line 171, and may reduce or effectively prevent capacitive coupling between the data line 171 and the first subpixel electrode 191h, and between the data line 171 and the second subpixel electrode 191l.

The first subpixel electrode 191h and the second subpixel electrode 191l receive a data voltage through the first contact hole 185h and the second contact hole 185l, from the first drain electrode 175h and the second drain electrode 175l, respectively. The first subpixel electrode 191h and the second subpixel electrode 191l to which the data voltage is applied generates an electric field in conjunction with the common electrode 270 of the upper panel 200 to determine a direction of the liquid crystal molecules of the liquid crystal layer 3 between the two electrodes 191 and 270. As described above, according to the determined direction of the liquid crystal molecules, the luminance of light that passes through the liquid crystal layer 3 is changed.

As illustrated in FIG. 13, in a case where the pixel electrode includes a plurality of fine branched parts, rainbow stains of periodic pattern may occur because of scattering at the edge of the pixel electrode. In the case where the thickness of the pixel electrode is reduced, scattering occurring at the edge of the pixel electrode can be reduced and the rainbow stains can be reduced.

Referring to FIG. 14, the second semiconductor 154l is on the gate insulating layer 140, and the second ohmic contact 164b is on the second semiconductor 154l. The second drain electrode 175l is on the second ohmic contact 164b. The second contact hole 185l is extended through thicknesses of the lower passivation layer 180p, the light blocking member 220 and the upper passivation layer 180q, and to expose a portion of the second drain electrode 175l. The second subpixel electrode 191l is the contact member on the second contact hole 185l. An auxiliary member 92 is on the contact member second subpixel electrode 191l.

The thicknesses of the first and second subpixel electrodes 191l and 191h may be about 40 nm or less. Even though the thicknesses of the first and second subpixel electrodes 191l and 191h are reduced, since the auxiliary member 91 is on and in the contact hole 185l, the connection defects may be reduced or effectively prevented.

The structure of FIG. 14 corresponds to the structure of the D region of FIG. 3. FIG. 14 illustrates the application of the exemplary embodiment of FIG. 3 in which the double layer is in the contact hole overlapping the drain electrode, but in addition to this, another exemplary embodiment of the present invention may be applied. A metal layer may be filled in the second contact hole 185l overlapping the second drain electrode 175l, and the first and second subpixel electrodes 191l and 191h may be thereon as illustrated in region D of FIG. 10.

Referring to FIG. 15, a gate line 121 is directly on the lower substrate 110. The gate insulating layer 140 is on the gate line 121. The data line 171 is on the gate insulating layer 140. A passivation layer 180 is on the data line 171.

In the case of a gate pad of the display device, a contact hole is extended through a thickness of the gate insulating layer 140 and the passivation layer 180, and exposes a portion of the gate line 121. A contact member 81a and an auxiliary member 91a are in and fill the contact hole.

In the case of a data pad of the display device, a contact hole is extended through a thickness of the passivation layer 180 and exposes a portion of the data line 171. A contact member 81b and an auxiliary member 91b are in and fill the contact hole.

The contact members 81a and 81b are in the same layer as the pixel electrode 191h and 191l, and the contact members 81a and 81b may include the same material as the pixel electrode 191h and 191l.

The structure of the gate pad of FIG. 15 corresponds to the structure of the B region of FIG. 3, and the structure of the data pad corresponds to the structure of the C region of FIG. 3. FIG. 15 illustrates the application of the exemplary embodiment of FIG. 3 in which the double layer is in the contact hole, but in addition to this, another exemplary embodiment of the present invention may be applied. A metal layer may be filled in the contact hole, and the contact members 81a and 81b may be thereon as illustrated in regions B and C of FIG. 10.

As described above, it is possible to increase transmittance of a display device by reducing a thickness of a pixel electrode of a display device.

In the case where the pixel electrode includes a plurality of fine branched parts, scattering that is generated at the edge of the pixel electrode by reducing the thickness of the pixel electrode may be reduced, such that rainbow stains may be reduced.

By reducing the thickness of the pixel electrode, the connection defect problem between different conductive layers can be solved.

Various characteristics of the exemplary embodiments of the present invention may be applied to display devices of different structures and various drivers.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
   a first substrate;
   a pixel part on the first substrate;
   a driver which is disposed at an edge portion of the first substrate and outside the pixel part, the driver applying a signal to the pixel part to drive the pixel part;
   an insulating layer disposed in the pixel part and in the driver; and
   a first single conductive material layer disposed directly on the insulating layer, in the pixel part and the driver; and
   a second single conductive material layer disposed directly on the first single conductive material layer to dispose the first single conductive material layer between the insulating layer and the second single conductive material layer,
   wherein the pixel part comprises:
   a switching element on the first substrate;
   the insulating layer including a first contact hole disposed on an electrode of the switching element; and
   a pixel electrode as a portion of the first single conductive material layer, directly connected to the electrode of the switching element at the first contact hole,
   wherein the driver comprises:
   a data conductive layer on the first substrate;
   the insulating layer including a second contact hole disposed on the data conductive layer;
   a contact member as a portion of the first single conductive material layer, the contact member directly connected to the data conductive layer at the second contact hole; and
   a first auxiliary member as a portion of the second single conductive material layer, and
   wherein in the pixel part, the portion of the first single conductive material layer as the pixel electrode does not overlap the second single conductive material layer disposed directly on the first single conductive material layer.

2. The display device of claim 1, wherein:
a thickness of the pixel electrode is about 30 nanometers.

3. The display device of claim 2, wherein:
the pixel electrode includes indium-tin-oxide.

4. The display device of claim 3, wherein:
the pixel electrode includes a plurality of fine branched parts.

5. The display device of claim 4, wherein:
the pixel electrode includes a first subpixel electrode and a second subpixel electrode which are separated from each other, and
the first subpixel electrode and second subpixel electrode each include a plurality of fine branched parts.

6. The display device of claim 5, further comprising:
a data line and a gate line on the first substrate,
wherein
the first subpixel electrode is connected through a first switching element, to the data line and the gate line,
the second subpixel electrode is connected through a second switching element, to the data line and the gate line, and
the second subpixel electrode is connected through a third switching element to a capacitor.

7. The display device of claim 1, further comprising:
a second substrate which faces the first substrate, and
a common electrode which receives a common voltage and is on the second substrate.

8. The display device of claim 1, wherein:
a total thickness of the contact member and the first auxiliary member is larger than a thickness of the pixel electrode by 10 nanometers or more.

9. The display device of claim 1, wherein:
the first auxiliary member has a higher etching rate than the contact member.

10. The display device of claim 1, wherein:
the first auxiliary member is only on the second contact hole.

11. The display device of claim 1, further comprising:
a gate line which is connected to the switching element, and transmits a gate signal to the switching element, and a data line which is connected to the switching element and transmits a data signal to the pixel electrode.

12. The display device of claim 11, further comprising:
a gate pad which is connected to an end of the gate line, wherein the second contact hole is disposed on the gate pad.

13. The display device of claim 11, further comprising:
a data pad which is connected to an end of the data line, wherein the second contact hole is disposed on the data pad.

14. A display device, comprising:
a substrate;
a pixel part on the substrate and including a pixel electrode;
a driver which is disposed at an edge portion of the substrate and outside the pixel part, the driver applying a signal to the pixel part to drive the pixel part; and
disposed in both the pixel part and the driver:
    an insulating layer and a data conductive layer, disposed on the substrate;
    a single metal layer disposed directly on the insulating layer; and
    a single conductive material layer disposed directly on the single metal layer to dispose the single metal layer directly between the insulating layer and the single conductive material layer,
wherein
within the pixel part,
    the insulating layer includes a first contact hole filled with a first portion of the single metal layer,
    the pixel electrode as a portion of the single conductive material layer extends to define a portion thereof as a first contact member connected to the first portion of the single metal layer at the first contact hole, the first contact member disposing the first portion of the single metal layer directly between the insulating layer and the first contact member, and
    a portion of the first contact member is in contact with the first portion of the single metal layer at the first contact hole, an entirety of the portion of the first contact member which is in contact with the first portion of the single metal layer at the first contact hole being disposed external to the first contact hole to contact both the first portion of the single metal layer and the insulating layer, and
within the driver,
    the insulating layer includes a second contact hole filled with a second portion of the single metal layer,
    a second contact member is a portion of the single conductive material layer, the second contact member disposing the second portion of the single metal layer directly between the insulating layer and the second contact member, and
    a portion of the second contact member is in contact with the second portion of the single metal layer at the second contact hole, an entirety of the portion of the second contact member which is in contact with the second portion of the single metal layer at the second contact hole being disposed external to the second contact hole to contact both the second portion of the single metal layer and the insulating layer.

15. The display device of claim 14, wherein:
the first contact member includes a same material as the pixel electrode.

16. The display device of claim 15, wherein the pixel part further includes a switching element which is connected to the pixel electrode,
further comprising:
    a gate line which is connected to the switching element, and transmits a gate signal to the switching element, and
    a data line as a portion of the data conductive layer, which is connected to the switching element, and transmits a data signal to the pixel electrode.

17. The display device of claim 16, further comprising:
a gate pad which is connected to an end of the gate line, wherein the contact hole is on the gate pad.

18. The display device of claim 16, further comprising:
a data pad as a portion of the data conductive layer, which is connected to an end of the data line, wherein the insulating layer includes a third contact hole filled with a third portion of the single metal layer, at the data pad.

19. The display device of claim 16, wherein:
the switching element includes:
    a gate electrode which is connected to the gate line,
    a source electrode which is connected to the data line, and
    a drain electrode as a portion of the data conductive layer, which is connected to the pixel electrode, and
the first contact hole overlaps the drain electrode.

20. The display device of claim 14, wherein:
the metal layer comprises an electroless plated material which fills the first and second contact holes.

\* \* \* \* \*